July 27, 1937.  F. G. SANCHEZ  2,088,442
BUILT-UP WHEEL AND AXLE
Filed July 6, 1935
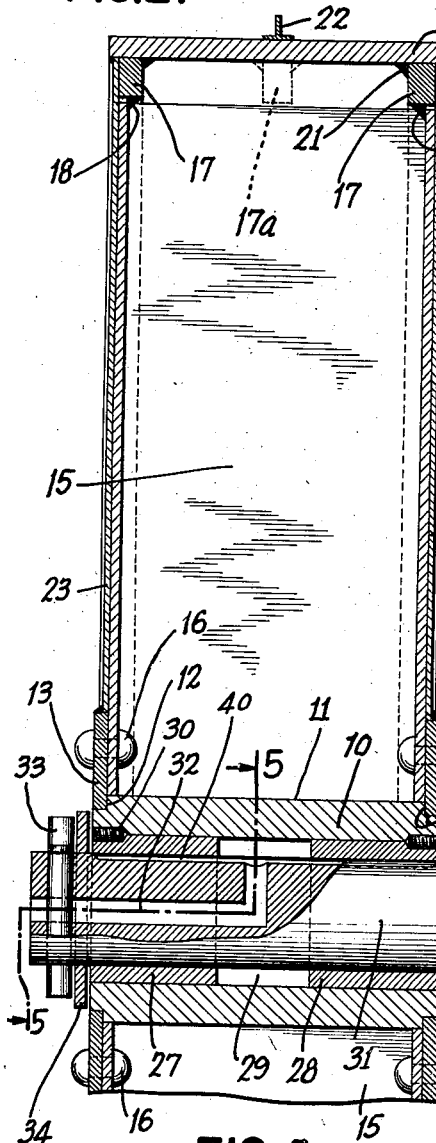

Patented July 27, 1937

2,088,442

UNITED STATES PATENT OFFICE 2,088,442

BUILT-UP WHEEL AND AXLE

Federico G. Sanchez, Velado, Habana, Cuba

Application July 6, 1935, Serial No. 30,089
In Cuba April 1935

10 Claims. (Cl. 301—63)

This invention has for its object the provision of a built up wheel and axle which will be both strong and relatively light in weight and in which the built up wheel will be of a general configuration which will prevent the accumulation of mud, water, debris or like material within the wheel when in use.

Heretofore, in cane fields, in the carting of sugar cane, two general types of transportation equipment have been employed. One, the crawler type, is relatively heavy and is expensive in initial cost and in maintenance costs. The other type comprises various forms of round wheels. These wheels may be wooden or steel wheels, the latter being of the built up variety. Some of the built up steel wheels are of the spoke in tension type and others are of the compression type. All of such wheels have a common defect when used on muddy roads or in muddy fields. They all accumulate mud and refuse around the spokes inside of the rim and such accumulation increases tractive effort when the wheels are in use. The strength of former wheels is also insufficient to carry the very heavy loads unless the weight factor is disregarded and such former wheels weaken with use. Simple disc wheels are too heavy to be of utility for the intended service.

The present invention has for one of its objects the provision of a built up wheel structure which will have the light weight characteristics of spoke wheels, with increased strength characteristics and with a form and configuration which will prevent undue collection of mud or debris upon the wheel and the entrance of water into the interior of the wheel.

A further object of the present invention resides in the provision of a built up wheel construction which will be inexpensive, light, durable and strong enough to withstand heavy loads and rough usage.

A further object of the present invention resides in the provision of a built up axle construction which will be adaptable for use with the wheel constructions mentioned above and which will have the characteristics of lightness, strength and durability as well as providing a simple means for the greasing of wheels and for the retention of grease therein.

A further object is to provide a wheel which is comparatively easy to manufacture, assemble and which is comparatively inexpensive.

Further and other objects of the present invention will be hereinafter set forth in the accompanying specification and claims and shown in the drawing which shows by way of illustration a preferred embodiment and the principle thereof and what I now consider to be the best mode in which I have contemplated of applying that principle. Other embodiments of the invention employing the same or equivalent principle may be used and structural changes made as desired by those skilled in the art without departing from the present invention and within the spirit of the appended claims.

In the drawing:

Figure 1 shows a fragmentary side elevational view of my improved wheel with certain parts of the outer closing disc broken away to show the interior construction;

Fig. 2 is a sectional view taken substantially on line 2—2 of Fig. 1. This view also shows the associated built up axle and journal arrangement;

Fig. 3 is a detail sectional view taken substantially on line 3—3 of Fig. 1 and looking in the direction of the arrows and shows the means which is provided to allow the insertion of cables, etc. through the wheel;

Fig. 4 is a detail sectional view through the built up axle, the section being taken substantially on line 4—4 of Fig. 2; and Fig. 5 is a detail sectional view, the section being taken substantially on line 5—5 of Fig. 2 and looking in the direction of the arrows.

In more detail in the drawing, referring first to Figs. 2 and 5, the built up wheel will be first described. In general the wheel comprises a hub portion, a spoke portion, a felly portion, a tire portion and covering disc portion. The hub portion, generally designated 10, may be in the form of a metal casting polygonal in shape intermediate its ends. The polygonally shaped portion of the hub, in a six spoke embodiment, is preferably hexagonal as shown in Fig. 5 and has flat surfaces 11 against which the ends of the spokes are adapted to abut. The hub portion 10 is provided at its ends with peripheral or annular recesses generally designated 12 adapted to receive spoke retaining rings 13. The spokes are preferably in the form of steel I-beams 15. These I-beams are cut off to proper length and are placed with their inner ends abutting the respective flats 11 of the intermediate part of the hub. Thereafter the inner ends of the spokes are secured in any suitable manner as by riveting the flanges of the I-beam spokes to the spoke retaining discs 13. In practice two rivets 16 may be provided extending through each flange of each I-beam spoke and through each disc 13. Accordingly, each spoke is secured by four rivet fastenings 16. Two rivets extend through one flange of the spoke and through the retaining disc on one side of the hub and two rivets extend through the other flange of the spoke and through the retaining disc at the opposite side of the hub. This provides an extremely rigid construction and holds the spokes securely in abutting contact with the flat portions of the hub.

After the spokes have all been secured in position the felly members are placed in position. Preferably the felly members comprise multiple, spaced, annular ring-like elements 17 of steel. The number of such ring-like elements 17 to be employed will vary depending upon the size of the wheel. For a certain size wheel two ring-like elements are sufficient, but for larger sizes a third ring indicated at 17a (Fig. 2) may be employed. After the ring-like felly elements are in position, these elements may be secured to the spokes by welding as indicated at 18 (Fig. 2). The spokes may be also secured to the felly rings by welding at the point 19 (Fig. 1). Surrounding the felly elements 17 is a tire element 20 in the form of a steel band which is preferably welded to the felly elements at 21. The tire element 20 may be provided with a metallic antiskid bead 22 substantially centrally thereof. This anti-skid bead may be of any desired form, either of T section as indicated at 22 or of other shape as desired.

As the last step to complete the wheel, two annular steel closing discs 23 are placed at each side abutting the flanges of the I-beam spokes. Such closing discs are welded to the spoke securing rings as indicated at 24 and to the tire as indicated at 25. The discs close up the wheel completely so as to make it water-tight and to prevent mud or other debris from collecting within the wheel rim when the wheel is in use. Just before closing up the wheel, three pipe nipples 26 are placed in position, preferably as near to the rim as possible and in abutting contact with every other spoke. Such pipe nipples pass through apertures in the closing discs and are welded to each disc to provide a water and mud tight seal. If desired, each pipe nipple may be welded to the adjacent spoke or to the adjacent felly rings or to both the spoke and felly rings. The purpose of these pipe nipples is to provide openings through the wheel through which a cable may be passed when it is desired to pull the wheel out of extremely bad ground.

Again referring to the hub portion and spoke securing means, it will be understood that the fastening means is of such type and the cooperation of the ends of the I-beam spokes with the flat portions of the hub is such that the spokes will be prevented from shifting relatively to each other. This arrangement provides for a comparatively strong and rigid structure which is relatively light in weight and yet at the same time simple to manufacture and assemble.

Referring to Fig. 2 of the drawing, the hub 10 is bored out to receive bushings 27 and 28. These bushings 27 and 28 are spaced apart from each other affording an intervening grease retaining space 29. The bushings are preferably maintained in position by screws such as 30 which are so disposed as to cooperate both with the bushings and with the hub body. By removing the screws 30 the bushings may be removed for replacement when worn. The bushing elements 27 and 28 cooperate with a stub axle shaft generally designated 31. To provide for greasing of the built up wheel when such wheel is mounted upon the axle, the axle shaft is provided with a greasing duct 32, having a portion extending centrally with respect to the shaft, and terminating with an open outlet at the end of the shaft and having a radially extending duct portion extending to the grease retaining space 29. To secure the wheel upon the shaft a pin 33 may be provided. This pin is of such configuration and size that it may be used as a plunger for forcing the grease through the duct 32. After sufficient grease is forced into the grease retaining space, the pin 33 is placed through an opening in the end of the shaft which is disposed in such position that the wheel securing pin 33 will intercept the grease duct 32 and substantially block the outflow of grease therefrom. Suitable washers 34 may also be provided, one washer cooperating with the end of the hub and the pin 33 and the other washer being disposed at the opposite side of the hub.

Built up axle

In order to provide for lightness, strength and durability, the axle is of built up configuration. As shown, the axle shaft 31 is a short stub shaft. Such stub shaft at its end remote from the outside of the wheel, extends into the filler block 36 (see Figs. 4 and 2). The filler block 36 is bored out to receive the axle shaft 31 and is of such shape as to receive two channels 37 and 38 which channels constitute the middle section of the axle. To secure the channels together and to the filler block, fastening means in the form of bolts 39 are provided. Such bolts extend through openings in the filler block and openings in the channels and the shaft 31 is grooved out so that the fastening bolts 39 pass through the grooves at the sides of such shaft. By this arrangement the fastening means serve the dual purpose of securing the channel elements 37 and 38 to the filler block 36 and also the bolts serve to prevent the endwise displacement of the stub shaft 31 from the filler block and also prevent relative rotation of the shaft 31 with respect to the filler block and to the intermediate axle structure.

All of the parts of both wheel and axle are constructed of suitable metal.

The stub axle 31 adjacent the bushings may be provided with a grease distributing groove 40 to distribute the grease from the grease retaining space along the bushings.

What I claim is:

1. A built up wheel comprising a hub portion provided with a plurality of flat portions providing seats for spokes, a plurality of spokes of I-beam section abutting at their inner ends said flat portions of the hub, ring-like elements seated upon the hub portion and secured with fastening means to the flange portions of the I-beam spokes to maintain the spokes in cooperation with the hub and for preventing relative shifting of the spokes with respect to each other, a tire and multiple ring felly elements contacting and secured by welding to the outer ends of the spokes and also welded to the tire.

2. A built up wheel comprising a hub portion provided with a plurality of flat portions providing seats for spokes, a plurality of spokes of I-beam section abutting at their inner ends said flat portions of the hub, ring-like elements seated upon the hub portion and secured with fastening means to the flange portions of the I-beam spokes to maintain the spokes in cooperation with the hub and for preventing relative shifting of the spokes with respect to each other, a tire, multiple felly elements contacting and secured by welding to the outer ends of the spokes and also welded to the tire, and closing discs extending from the ring-like spoke securing elements to the tire and being welded at their inner and outer periphery to the ring-like spoke securing elements and to the tire to close in the wheel and to prevent the access of mud and the like into the interior thereof when in use.

3. A built up steel wheel comprising a hub portion, a felly portion, a tire portion and an intermediate spoke portion between the hub and felly portions, said hub portion intermediate its ends being polygonal in shape to provide flat portions against which the ends of the spokes abut, said hub portion being also provided at its ends with annular recesses, ring-like elements seated in said recesses, the spoke portion of the wheel comprising spokes of I-beam cross-section riveted through the flanges thereof to the ring-like elements, said spokes at their inner ends abutting the flat portions of the hub and at their outer ends being welded to multiple spaced rings which constitute the felly portion, said multiple spaced rings being also welded to the outer tire portion, and closing discs welded to the spoke securing rings and to the tire to close in the wheel and prevent mud, water and the like accumulating therein.

4. A built up steel wheel comprising a hub portion, a felly portion, a tire portion and an intermediate spoke portion between the hub and felly portion, said hub portion intermediate its ends being polygonal in shape to provide flat portions against which the ends of the spokes abut, said hub portion being also provided at its ends with annular recesses, ring-like elements seated in said recesses, the spoke portion of the wheel comprising spokes of I-beam cross-section riveted through the flanges thereof to the ring-like elements, said spokes at their inner ends abutting the flat portions of the hub and at their outer ends being welded to multiple spaced rings which constitute the felly portion, said multiple spaced rings being welded to the outer tire portion and closing discs welded to the inner spoke securing rings and to the tire to close in the wheel and prevent mud, water and the like accumulating therein, and a plurality of tubular elements extending through the discs to provide apertures through the wheel through which a cable or the like may be based for the purpose described.

5. A built up steel wheel comprising a hub portion, a felly portion, a tire portion, and an intermediate spoke portion between the hub and felly portion, said hub portion intermediate its ends being polygonal in shape to provide flat portions against which the ends of the spokes abut, said hub portion being also provided at its ends with annular recesses, ring-like elements seated in said recesses, the spoke portion comprising spokes of I-beam cross-section riveted through the flanges thereof to the ring-like elements, said spokes at their inner ends abutting the flat portions of the hub and at their outer ends being welded to multiple spaced rings which constitute the felly portion, said multiple spaced rings being welded to the outer tire portion and closing discs welded to the inner spoke securing rings and to the tire to close in the wheel and prevent mud, water and the like accumulating therein, the aforesaid closing discs carrying pipe-like elements which span the space from disc to disc to provide cable receiving apertures through the wheel, the pipe-like elements being welded to the discs and being disposed in abutting proximity to the spokes to transmit forces directly to the spokes.

6. A built up steel wheel comprising a hub portion, a felly portion, a tire portion and an intermediate spoke portion between the hub and felly portion, said hub portion intermediate its ends being polygonal in shape to provide flat portions against which the ends of the spokes abut, said hub portion being also provided at its ends with annular recesses, ring-like elements seated in said recesses, the spoke portion comprising spokes in the form of members each comprised of a single structural shape working under compression and all spokes being secured to the ring-like elements, said spokes at their inner ends abutting the flat portions of the hub and at their outer ends being welded to multiple spaced rings which constitute the felly portion, said multiple spaced rings being welded to the outer tire portion and closing discs welded to the inner spoke securing rings and to the tire to close in the wheel and prevent mud, water and the like accumulating therein.

7. A built up steel wheel comprising a metallic hub portion, a metallic felly portion which comprises multiple, spaced, ring-like elements, a metallic tire element welded to the felly portion, and a spoke portion intermediate the hub and felly portion, the aforesaid hub portion intermediate its ends, being polygonal in shape to provide flat portions against which the ends of the spokes abut, said hub portion being provided at its ends with annular recesses, ring-like elements seated in said recesses, the spoke portion comprising spokes of steel of I-beam cross-section riveted through the flanges thereof to the ring-like elements, said I-beam spokes at their inner ends abutting the flat portion of the hub and at their outer ends contacting with and being welded to the ring elements of the felly portion.

8. A built up wheel comprising a hub portion provided with a plurality of flat portions providing seats for spokes, the plurality of spokes each comprising a one piece integral metallic structural section with flat inner ends which abut the aforesaid flat portions of the hub, ring-like elements associated with the hub portion and secured to the side portions of the spokes to maintain the spokes in cooperation with the hub and for preventing relative shifting of the spokes with respect to each other, and felly and tire means around said spokes with said spokes at their outer ends contacting with and secured by welding to said felly means.

9. The invention set forth in claim 8 in which annular closing discs are provided one at each side of the wheel and welded to the ring-like elements and to the tire means to close in the wheel and prevent the access of mud and the like into the interior thereof when in use.

10. The invention set forth in claim 8 in which annular closing discs are provided one at each side of the wheel and welded to the ring-like elements and to the tire means to close in the wheel and prevent the access of mud and the like into the interior thereof when in use and a plurality of nipples extending through said discs and in proximity to the spokes to provide openings through the wheel through which a cable may be passed for the purpose described.

FEDERICO G. SANCHEZ.